United States Patent
Shi et al.

(10) Patent No.: US 7,899,326 B2
(45) Date of Patent: Mar. 1, 2011

(54) SYSTEM FOR UTILIZING WAVELENGTH REACHABILITY AND WAVELENGTH OCCUPATION STATUS INFORMATION TO DESCRIBE CROSS-CONNECTION CAPABILITIES IN OPTICAL NETWORKS

(75) Inventors: Xinghua Shi, Shenzhen (CN); Baoquan Rao, Shenzhen (CN); Yu Wang, Shenzhen (CN); Chunhui Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 931 days.

(21) Appl. No.: 11/622,115

(22) Filed: Jan. 11, 2007

(65) Prior Publication Data
US 2008/0170856 A1   Jul. 17, 2008

(30) Foreign Application Priority Data
Jul. 19, 2006   (CN) .......................... 2006 1 0099398

(51) Int. Cl.
*H04J 14/00* (2006.01)
(52) U.S. Cl. ................ 398/50; 398/45; 398/48; 398/49; 398/56; 398/57; 370/248; 370/351; 370/352; 370/389; 370/395.31
(58) Field of Classification Search ............ 398/59, 398/45, 46, 47, 48, 49, 50, 51, 52, 53, 54, 398/55, 56, 57, 58, 79, 83; 370/248, 351, 370/352, 389, 409, 392, 393, 395.31, 395.2
See application file for complete search history.

(56) References Cited

U.S. PATENT DOCUMENTS

| 6,738,354 | B1 * | 5/2004 | Ashwood Smith | 370/248 |
| 2003/0035166 | A1 * | 2/2003 | Zhang et al. | 359/118 |
| 2003/0147645 | A1 * | 8/2003 | Imajuku et al. | 398/7 |
| 2004/0258409 | A1 * | 12/2004 | Sadananda | 398/50 |
| 2007/0212067 | A1 * | 9/2007 | Miyazaki et al. | 398/57 |

FOREIGN PATENT DOCUMENTS

| CN | 1431834 A | 7/2003 |
| CN | 1601934 A | 3/2005 |
| CN | 1756185 A | 4/2006 |
| EP | 1303110 A2 | 4/2003 |

(Continued)

OTHER PUBLICATIONS

Al-Fuqaha A I et al: "Routing in all-optical DWDM networks with sparse wavelength conversion capabilities"; GLOBECOM '03. 2003—IEEE Global Telecommunications Conference. Conference Proceedings. San Francisco, Dec. 1-5, 2003, IEEE Global Telecommunications Conference, New York, NY : IEEE, US. vol. 7 of 7.

(Continued)

*Primary Examiner* — Hanh Phan
(74) *Attorney, Agent, or Firm* — Brinks Hofer Gilson & Lione

(57) ABSTRACT

A system for communicating cross-connection information within an optical network by use of wavelength information is provided. Cross-connection information in Wavelength Division Multiplexing (WDM) devices is abstracted, to produce wavelength reachability information and wavelength occupation status information for each node within the optical network. Cross-connection information is distributed from one node to all other nodes or a Path Calculation Equipment (PCE), through extended routing protocols, providing a base for calculating service paths.

12 Claims, 1 Drawing Sheet

FOREIGN PATENT DOCUMENTS

| | | |
|---|---|---|
| JP | 2004-80666 A | 3/2004 |
| JP | 2004-320390 A | 11/2004 |

OTHER PUBLICATIONS

Eiji Oki NTT Nobuaki Matsuura NTT Wataru Imajuku NTT Kohei Shiomoto NTT Naoaki Yamanaka NTT: "Requirements of optical link-state information for traffic engineering draft-oki-ipo-optlink-req-00.txt" IETF Standard-Working Draft, Internet Engineering Task Force, IETF, CH, Feb. 2002.

Awduche D et al: "Multiprotocol Lambda Switching: Combining MPLS Traffic Engineering Control with Optical Crossconnects" IEEE Communications Magazine, IEEE Service Center, New York, NY, US, vol. 39, No. 3, Mar. 2001.

Sengupta S et al: Analysis of enhanced OSPF for routing lightpaths in optical mesh networks: ICC 2002. 2002 IEEE International Conference on Communications. Conference Proceedings, New York, NY, Apr. 28-May 2, 2002, IEEE International Conference on Communications, New York, NY: IEEE, US, vol. 1 of 5.

John Strand et al, Issues for Routing in the Optical Layer, IEEE Communications Magazine, Feb. 2001, vol. 39, Issue 2.

Ashwood-Smith, Peter et a. Link Viability Constraints Requirements for GPLS-enabled Networks—draft- ashwood-ccamp-gmpls-contraint-reqts-00.txt. Internet Engineering Task Force. Jul. 2005.

Written Opinion of the International Searching Authority issued in corresponding PCT Application No. PCT/CN2007/000893; mailed Jul. 5, 2007.

Office Action issued in corresponding European Patent Application No. 07 003 796.5; issued Nov. 14, 2008.

Office Action issued in corresponding Chinese Patent Application No. 200610099398.4; mailed Aug. 7, 2009.

Office Action issued in corresponding Chinese Patent Application No. 200610099398.4; mailed Feb. 12, 2010.

* cited by examiner

SYSTEM FOR UTILIZING WAVELENGTH REACHABILITY AND WAVELENGTH OCCUPATION STATUS INFORMATION TO DESCRIBE CROSS-CONNECTION CAPABILITIES IN OPTICAL NETWORKS

TECHNICAL FIELD OF THE INVENTION

The present invention relates generally to optical network communications, and more particularly, to a versatile system for utilizing wavelength reachable information to describe cross-connection capabilities in optical networks.

BACKGROUND OF THE INVENTION

An Automatically Switched Optical Network (ASON) is a type of dynamically and automatically switched transport network. It's a new generation optical network, where: a service request is originated dynamically by users; a path is calculated and selected automatically by a network element; setup, restoration and clearance of a connection are controlled by signaling; and switching and transporting are integrated. An ASON includes two layers: a control plane and a transport plane. Main functions of a control plane include: collecting and distributing network topology of an ASON; forming a "network map" describing network topology; calculating a viable path through routing algorithms and by use of the "network map", and establishing an intelligent circuit using a signaling protocol for each node on the path. Functions of a transport plane include setting up or deleting cross-connections on each network element, and establishing or withdrawing services on the transport plane, according to instructions from a control plane.

Wavelength Division Multiplexing (WDM) is a technology to transport services with various wavelengths. Rapid increases of image and data services cause tremendous demands for network bandwidth, and the conventional WDM technology is intended to meet such bandwidth demands. A WDM device can be divided into a long-distance WDM device and a metropolitan WDM device. A long-distance WDM device is commonly used as a national trunk or a regional trunk, for long-distance and high-capacity transmissions. A metropolitan WDM device is mainly used for data service transmissions in rapidly developing metropolitan networks. Traditional WDM networks are point-to-point static networks. However, the emergence of Reconfigurable Optical Add/Drop Multiplexer (ROADM)/Wavelength Selective Switching (WSS) technology makes dynamic WDM networks possible; so that vendors are able to provide new services, and add or modify network services dynamically, without the need to redesign networks. In addition, combining WDM devices and ASON technology can reduce operational expenditures.

However, because of certain optical limitations existing in WDM devices and due to low integrity, cross-connection constraints may exist in WDM devices (i.e. there may be blocking in wavelength switching of WDM devices), which may not be like Synchronous Digital Hierarchy (SDH), where one channel may be easily cross-connected to another. Cross-connection constraints cause problems in path calculations in an ASON. Moreover, in a WDM network, sometimes it may not be possible to establish a wavelength service between two nodes that are reachable in topology and have resources available.

Previous solutions have provided abstract models to determine reachability information between access points of a network; thus, solving certain blocking and constraint problems in pure photonic Generalized Multiprotocol Label Switching (GMPLS) network sub-domains. For example, in an abstract model, a pure photonic GMPLS network may be abstracted into a logical or abstract cloud, and reachable information among access points of a Generalized Label Edge Router (GLER) is abstracted. With this abstract model, less information is distributed among GLER nodes. Due to insufficient information distributed, however, a label set would have to be used to restrict selection of wavelengths at setup time. Thus, even if such a restriction is applied, the rate for establishing a successful service path is low.

In another abstract model, a Generalized Label Switching Router (GLSR) node in a pure photonic GMPLS network may be abstracted into a logical/abstract GLSR node, and reachable information of links associated with a logical GLSR node is abstracted and distributed to other nodes. Information involved in this abstract model is large, but relatively complete. Therefore a higher rate of successful path calculations may be obtained when compared with the first model. In a WDM network, however, although a link may be reachable, it does not necessarily mean that wavelength is reachable. Thus an established service path may not necessarily be viable. For this reason, a crankback technology may need to be used, to repeatedly attempt to establish a service path.

Therefore, such conventional methods may not produce correct service path calculations. This can greatly decrease service setup efficiency, especially in cases where a service is restored after interruption. Repeated attempts are intolerable, because a new path should be computed and a service should be re-established as soon as possible. Another drawback is caused by high frequency of information distribution, since a link's reachability changes once a service is established, and such information must be updated in real-time, and distributed through out a whole network. This in turn, places a large demand overhead on a network.

Another conventional method typically configures services manually and statically using a network management system. For less powerful network management systems, manually designed configurations may be created and then distributed station by station. Powerful network management systems normally collect cross-connection capabilities and cross-connection constraints of each WDM device, and then calculate an appropriate path after considering the collected information.

However, manually designing and distributing configuration services is cumbersome, time-consuming and difficult to maintain. Moreover, automatically calculating service paths is similar to a centralized ASON, which is unsafe, heavy in network management system workload, and is difficult to reroute services dynamically.

Therefore, there is a need to overcome cross-connection constraint issues in a WDM device for an intelligent WDM network. There is also a need to provide correct service path calculations, and to decrease information distribution workload.

SUMMARY OF THE INVENTION

The present invention provides a system, comprising various constructs and methods, for communicating cross-connection information within an optical network, using wavelength information. The present invention abstracts the cross-connection information to produce wavelength reachability information, and wavelength occupation status information, for each node within the optical network, and distributes the wavelength reachability and wavelength occupation status information of each node to all other nodes, or a Path Calculation Equipment (PCE) of the optical network, through extended routing protocols.

The present invention provides wavelength reachability and wavelength occupation status information to describe cross-connection capabilities and constraints in wavelength division multiplexing devices, carries the information by adding some new fields in routing protocols, such as an Open Shortest Path First (OSPF), and distributes wavelength reachability information and wavelength occupation status information separately using the routing protocols. This decreases the amount of information distributed, improves network efficiency, and provides a base for feasible service path calculations in case of cross-connection constraints.

The present invention is further applicable to communicate sub-wavelength reachability information and sub-wavelength occupation status information.

The following description and drawings set forth in detail a number of illustrative embodiments of the present invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
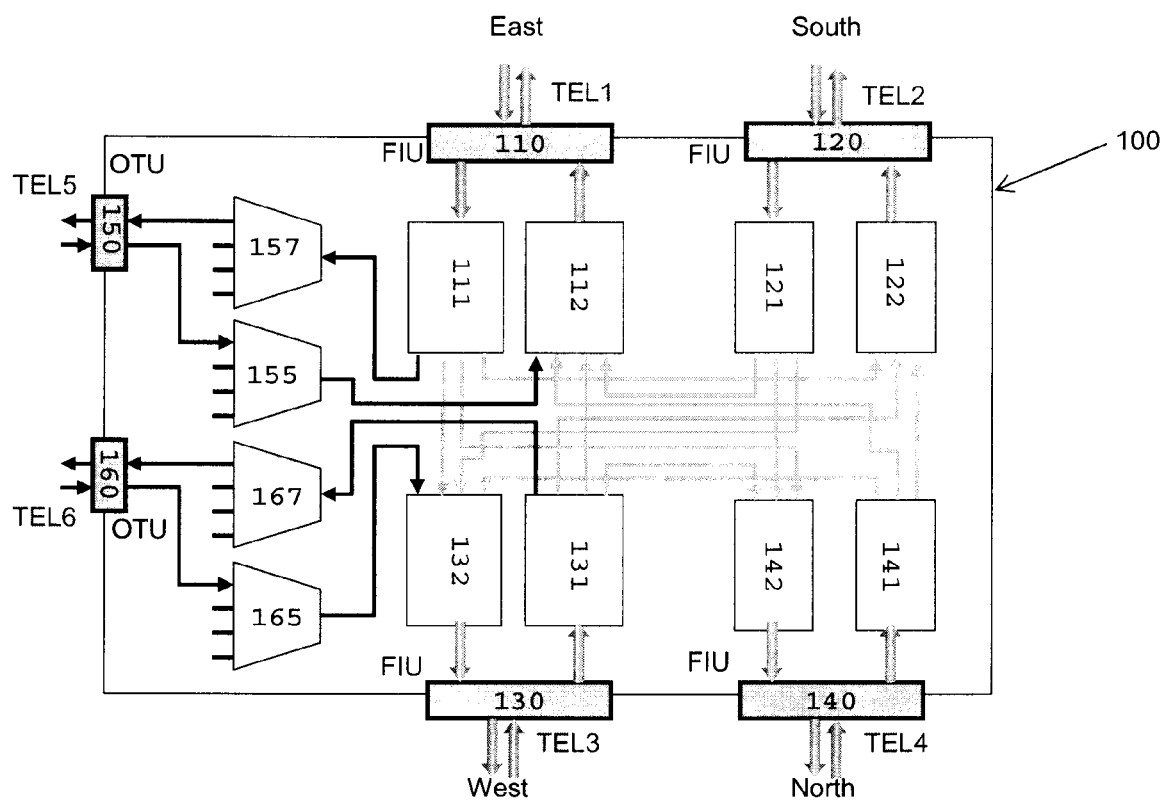
FIG. 1 is a diagram of a wavelength division multiplexing device illustrating cross-connection capabilities and cross-connection constraints among a plurality of traffic engineering links.

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

In the present invention, cross-connection capabilities of a Wavelength Division Multiplexing (WDM) device may be abstracted into wavelength reachability and wavelength occupation status information. The wavelength reachability and wavelength occupation status information may be distributed over a WDM network through a routing protocol, such as an extended Open Shortest Path First (OSPF) protocol; and may serve as a base of service path calculations for intelligent routing algorithms, so that wavelength services/sub-wavelength services may be automatically established or restored. The present invention effectively solves problems where difficulty exists in calculating service paths in a WDM network with cross-connection constraints, and facilitates an intelligent WDM network.

According to the present invention, a resource management system: acquires cross-connection capabilities and constraints of a WDM device; abstracts the acquired cross-connection information into wavelength reachability and wavelength occupation status information; and stores the wavelength reachability and wavelength occupation status information into a local data structure when the system is initialized. The resource management system updates wavelength reachability and wavelength occupation status information in real-time when cross-connection capabilities and constraints of the WDM device change.

A number of embodiments of obtaining wavelength reachability information are described hereafter. Since resources are represented and distributed in the form of Traffic Engineering links (TE links) in an ASON, wavelength reachability information may describe the reachability between all wavelengths of one TE link and that of the other TE links on the same device.

FIG. 1 illustrates an example of a WDM device (100), with cross-connection capabilities and cross-connection constraints among a plurality of TE links. WDM device (100) has four Fiber Interface Unit (FIU) boards (110), (120), (130) and (140), connected to fibers located in four directions. WDM device (100) has two upper/lower Optical Transponder Unit (OTU) boards (150) and (160), which are reachable to East and West, respectively, through internally connected fibers. Each FIU is connected with one Wavelength Selective Switching Multiplexer (WSSM), and with one Wavelength Selective Switching Demultiplexer (WSSD); and the WSSD of one FIU is connected to WSSMs of the other three FIUs. Each OTU is connected with one multiplexer (MUX) and one demultiplexer (DMUX). MUX (155) is connected with WSSM (112); DMUX (157) is connected with WSSD (111); MUX (165) with WSSM (132); and DMUX (167) with WSSD (131).

Signals traveling through a fiber come into or go out of WDM device (100) via a corresponding FIU. An optical signal on a fiber in the East is sent to WSSD (111) after being received by FIU (110), and the optical signal may be routed to WSSM (122), WSSM (132) or WSSM (142), where it may be output via FIU (120), FIU (130) or FIU (140), respectively. Alternatively, the optical signal may be routed to DMUX (157) for demultiplexing, and output via OTU (150). Signals coming in through the West fiber may be processed similarly. A signal may be received by FIU (130), sent to WSSD (131), and routed to WSSM (112), WSSM (122), WSSM (142) or DMUX (167), where the signal may be output via FIU (110), FIU (120), FIU (140) or OTU (160). Signals from the South fiber may be input through FIU (120), sent to WSSD (121), routed to WSSM (112), (132) or (142), and sent out via corresponding FIU (110), (130) or (140). Signals from the North fiber may be input through FIU (140), sent to WSSD (141), routed to WSSM (112), (122) or (132), and sent out via FIU (110), (120) or (130).

OTU (150) may convert wavelength of an input signal, and pass the input signal to MUX (155) for multiplexing. The multiplexed signal may be sent to WSSM (112) to be output via FIU (110). Similarly, OTU (160) may convert wavelength of an input signal and pass the input signal to MUX (165) for multiplexing. The multiplexed signal may be sent to WSSM (132) as output via FIU (130).

In this example, each fiber transmits 40 waves, each having a wavelength $\lambda 1$-$\lambda 40$, respectively. OTU board (150) works at a fixed wavelength $\lambda 1$, and OTU board (160) works at a tunable wavelength, which may be adjusted in the range of $\lambda 1$-$\lambda 40$.

FIG. 1 depicts an illustrative example. In practical applications, multiple diverse cross-connection constraints may exist in a WDM device—such as what is illustrated in FIG. 1, where fibers in the four directions may not necessarily be all cross-connected, and wavelength converted through an OTU board may not necessarily go in only one direction. All such cross-connection constraints or cross-connection capabilities are comprehended by the present invention.

FIG. 1 illustrates six TE links generated from nodes of WDM device (100), named TEL1-TEL6. According to FIG. 1, TEL1 may reach TEL2, TEL3 and TEL4 at wavelength $\lambda 1$-$\lambda 40$, and may reach TEL5 at only wavelength $\lambda 1$. However, TEL1 may not reach TEL6. TEL2 may reach TEL1, TEL3, and TEL4 at wavelength $\lambda 1$-$\lambda 40$. Similarly, wavelength reachability information for each TE link may be determined, as shown in Table 1 to Table 6.

TABLE 1

Wavelength Reachability of TEL1

| TE Link Described | Reachable Link | Reachable Wavelength |
|---|---|---|
| TEL1 | TEL2 | $\lambda 1$ |
|  |  | $\lambda 2$ |
|  |  | ... |
|  |  | $\lambda 40$ |
|  | TEL3 | $\lambda 1$ |
|  |  | $\lambda 2$ |
|  |  | ... |
|  |  | $\lambda 40$ |
|  | TEL4 | $\lambda 1$ |
|  |  | $\lambda 2$ |
|  |  | ... |
|  |  | $\lambda 40$ |
|  | TEL5 | $\lambda 1$ |

TABLE 2

Wavelength Reachability of TEL2

| TE Link Described | Reachable Link | Reachable Wavelength |
|---|---|---|
| TEL2 | TEL1 | $\lambda 1$ |
|  |  | $\lambda 2$ |
|  |  | ... |
|  |  | $\lambda 40$ |
|  | TEL3 | $\lambda 1$ |
|  |  | $\lambda 2$ |
|  |  | ... |
|  |  | $\lambda 40$ |
|  | TEL4 | $\lambda 1$ |
|  |  | $\lambda 2$ |
|  |  | ... |
|  |  | $\lambda 40$ |

TABLE 3

Wavelength Reachability of TEL3

| TE Link Described | Reachable Link | Reachable Wavelength |
|---|---|---|
| TEL3 | TEL1 | $\lambda 1$ |
|  |  | $\lambda 2$ |
|  |  | ... |
|  |  | $\lambda 40$ |
|  | TEL2 | $\lambda 1$ |
|  |  | $\lambda 2$ |
|  |  | ... |
|  |  | $\lambda 40$ |
|  | TEL4 | $\lambda 1$ |
|  |  | $\lambda 2$ |
|  |  | ... |
|  |  | $\lambda 40$ |
|  | TEL6 | $\lambda 1$ |
|  |  | $\lambda 2$ |
|  |  | ... |
|  |  | $\lambda 40$ |

TABLE 4

Wavelength Reachability of TEL4

| TE Link Described | Reachable Link | Reachable Wavelength |
|---|---|---|
| TEL4 | TEL1 | $\lambda 1$ |
|  |  | $\lambda 2$ |
|  |  | ... |
|  |  | $\lambda 40$ |
|  | TEL2 | $\lambda 1$ |
|  |  | $\lambda 2$ |
|  |  | ... |
|  |  | $\lambda 40$ |
|  | TEL3 | $\lambda 1$ |
|  |  | $\lambda 2$ |
|  |  | ... |
|  |  | $\lambda 40$ |

TABLE 5

Wavelength Reachability of TEL5

| TE Link Described | Reachable Link | Reachable Wavelength |
|---|---|---|
| TEL5 | TEL1 | $\lambda 1$ |

TABLE 6

Wavelength Reachability of TEL6

| TE Link Described | Reachable Link | Reachable Wavelength |
|---|---|---|
| TEL6 | TEL3 | $\lambda 1$ |
|  |  | $\lambda 2$ |
|  |  | ... |
|  |  | $\lambda 40$ |

The wavelength reachability information depicted above may be stored locally in an appropriate data structure, and reported to a routing sub-system for resource distribution.

A number of embodiments of obtaining wavelength occupation status information are described hereafter. Wavelength occupation status information describes whether wavelength resources of TE links are free, or occupied by a certain service. In the beginning, all wavelength resources are free. Wavelength occupation status changes as services are established and deleted. For example, if, at a certain time, wavelength $\lambda 1$, $\lambda 1$ and $\lambda 3$ of TEL1 in FIG. 1 are occupied, and the other wavelengths are free, then wavelength occupation status information of TEL1 may be described as shown in Table 7.

TABLE 7

Wavelength Occupation Status of TEL1

| TE Link Described | Wavelength | Wavelength Occupation Status |
|---|---|---|
| TEL1 | $\lambda 1$ | Occupied |
|  | $\lambda 2$ | Occupied |
|  | $\lambda 3$ | Occupied |

TABLE 7-continued

Wavelength Occupation Status of TEL1

| TE Link Described | Wavelength | Wavelength Occupation Status |
|---|---|---|
|  | λ4 | Free |
|  | ... | Free |
|  | λ40 | Free |

In implementation, whether a wavelength is free or occupied may be represented by 0 and 1, respectively.

Thus, cross-connection capabilities and constraints may be described using wavelength reachability and wavelength occupation status information. Wavelength reachability information is relatively fixed—that is, once board configuration is made, and internal optical fiber connections are determined for a WDM device, wavelength reachability generally does not change. Wavelength reachability information may be updated in operation, when boards are added or removed, or when internal fiber connections are changed.

and wavelength occupation status information may be distributed to all nodes, or to a Path Calculation Equipment (PCE), of a network, through an OSPF protocol or similar routing protocols; such that each node or PCE in the network has knowledge of wavelength reachability information and wavelength occupation status information of all nodes, serving as a for correct routing calculations.

If OSPF protocol is used as a routing protocol, wavelength reachability and wavelength occupation status information may be distributed via Link-State Advertisement type 10 (LSA10) (i.e. TE LSA) of OSPF. A link_TLV in LSA10 of OSPF describes details of all TE links that are related to one node. A TLV contains multiple sub_TLVs, such as link type sub_TLV, link ID sub_TLV, etc.

To distribute wavelength reachability information, one embodiment is to add a sub_TLV into link_TLV to describe wavelength reachability information of each TE link, which is named link reachability sub_TLV. The link reachability sub_TLV may contain wavelength reachability information of all TE links related to one TE link of a node, including number of reachable TE links, index of each reachable TE link, and reachable wavelengths. The sub_TLV may have a format of:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|S|                             |       reachable_link_num      |
+-+-+-+-+-+-+-+-+-+-+-+-+-+-+-+-+-+-+-+-+-+-+-+-+-+-+-+-+-+-+-+-+
|                         link1_if_index                        |
+-+-+-+-+-+-+-+-+-+-+-+-+-+-+-+-+-+-+-+-+-+-+-+-+-+-+-+-+-+-+-+-+
|                       reachable_lambda_num                    |
+-+-+-+-+-+-+-+-+-+-+-+-+-+-+-+-+-+-+-+-+-+-+-+-+-+-+-+-+-+-+-+-+
|                          Lambda1_value                        |
+-+-+-+-+-+-+-+-+-+-+-+-+-+-+-+-+-+-+-+-+-+-+-+-+-+-+-+-+-+-+-+-+
|                          Lambda2_value                        |
+-+-+-+-+-+-+-+-+-+-+-+-+-+-+-+-+-+-+-+-+-+-+-+-+-+-+-+-+-+-+-+-+
|                             ******                            |
+-+-+-+-+-+-+-+-+-+-+-+-+-+-+-+-+-+-+-+-+-+-+-+-+-+-+-+-+-+-+-+-+
|                          Lambdan_value                        |
+-+-+-+-+-+-+-+-+-+-+-+-+-+-+-+-+-+-+-+-+-+-+-+-+-+-+-+-+-+-+-+-+
|                             ******                            |
+-+-+-+-+-+-+-+-+-+-+-+-+-+-+-+-+-+-+-+-+-+-+-+-+-+-+-+-+-+-+-+-+
|                         linkn_if_index                        |
+-+-+-+-+-+-+-+-+-+-+-+-+-+-+-+-+-+-+-+-+-+-+-+-+-+-+-+-+-+-+-+-+
|                       reachable_lambda_num                    |
+-+-+-+-+-+-+-+-+-+-+-+-+-+-+-+-+-+-+-+-+-+-+-+-+-+-+-+-+-+-+-+-+
|                          Lambda1_value                        |
+-+-+-+-+-+-+-+-+-+-+-+-+-+-+-+-+-+-+-+-+-+-+-+-+-+-+-+-+-+-+-+-+
|                          Lambda2_value                        |
+-+-+-+-+-+-+-+-+-+-+-+-+-+-+-+-+-+-+-+-+-+-+-+-+-+-+-+-+-+-+-+-+
|                             ******                            |
+-+-+-+-+-+-+-+-+-+-+-+-+-+-+-+-+-+-+-+-+-+-+-+-+-+-+-+-+-+-+-+-+
|                          Lambdan_value                        |
+-+-+-+-+-+-+-+-+-+-+-+-+-+-+-+-+-+-+-+-+-+-+-+-+-+-+-+-+-+-+-+-+
```

That is, wavelength reachability information may be updated when optical network resources change.

Wavelength occupation status varies as services are established or deleted, and thus it may change relatively more often. Abstraction and distribution of resource occupation status information are a necessary part in an optical device, even in a fully cross-connected device, such as an SDH device. Using wavelength reachability information according to the present invention, together with wavelength occupation status information, cross-connection capabilities of a WDM device, where cross-connection constraints exist, are now clearly described. Furthermore, the relative stability of the wavelength reachability information saves bandwidth of a network control plane, and provides a solution with lower cost and higher efficiency.

After cross-connection capabilities of each node are abstracted into wavelength reachability and wavelength occupation status information, the wavelength reachability Each field is defined as follows:

S: a master/backup flag of a TE link; 0 represents master and 1 backup.

reachable_link_num: number of TE links reachable by a TE link.

link1_if_index: index of the first reachable TE link of a TE link.

reachable_lambda_num: number of reachable wavelengths of a TE link.

Lambdan_value: value of the $n^{th}$ wavelength that is reachable by a TE link.

To distribute wavelength occupation status information, one embodiment is to provide a BandWidth_TLV. The BandWidth_TLV describes bandwidth and other related information of a corresponding TE link. A sub_TLV may be added in the BandWidth_TLV to describe wavelength occupation status information of a corresponding TE link, which is named Lambda_status sub_TLV. The Lambda_status sub_TLV has a format of:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|                               |         lambda_number         |
+-+-+-+-+-+-+-+-+-+-+-+-+-+-+-+-+-+-+-+-+-+-+-+-+-+-+-+-+-+-+-+-+
|                         Lambda1_value                         |
+-+-+-+-+-+-+-+-+-+-+-+-+-+-+-+-+-+-+-+-+-+-+-+-+-+-+-+-+-+-+-+-+
|                         Lambda1_status                        |
+-+-+-+-+-+-+-+-+-+-+-+-+-+-+-+-+-+-+-+-+-+-+-+-+-+-+-+-+-+-+-+-+
|                         Lambda2_value                         |
+-+-+-+-+-+-+-+-+-+-+-+-+-+-+-+-+-+-+-+-+-+-+-+-+-+-+-+-+-+-+-+-+
|                         Lambda2_status                        |
+-+-+-+-+-+-+-+-+-+-+-+-+-+-+-+-+-+-+-+-+-+-+-+-+-+-+-+-+-+-+-+-+
|                             ******                            |
+-+-+-+-+-+-+-+-+-+-+-+-+-+-+-+-+-+-+-+-+-+-+-+-+-+-+-+-+-+-+-+-+
|                         Lambdan_value                         |
+-+-+-+-+-+-+-+-+-+-+-+-+-+-+-+-+-+-+-+-+-+-+-+-+-+-+-+-+-+-+-+-+
|                         Lambdan_status                        |
+-+-+-+-+-+-+-+-+-+-+-+-+-+-+-+-+-+-+-+-+-+-+-+-+-+-+-+-+-+-+-+-+
```

Each filed is defined as follows:

lambda_number: number of wavelengths of a TE link.

Lambdan_value: value of wavelength $\lambda n$ of a TE link.

Lambdan_status: occupation status of wavelength $\lambda n$ of a TE link. One bit may be used to represent whether a status is free or occupied. In real implementations, each bit of the four bytes for Lambdan_status may be used to represent a designated status.

By adding TLVs as described above, OSPF protocol may be used to distribute cross-connection capabilities of each node to every other node, or to a PCE, within a network, by way of wavelength reachability and wavelength occupation status information. Wavelength reachability information and wavelength occupation status information may be provided in link_TLV and BandWidth_TLV, respectively, encapsulated in separate LSA10, and distributed separately. Thereby network workload is reduced and network efficiency improved. Service paths in a WDM network may be calculated using wavelength reachability information and wavelength occupation status information.

The present invention is applicable not only to wavelength reachability distribution of TE links, but also to sub-wavelength reachability distribution. Cross-connection constraints exist in sub-wavelength service dispatching, which are also comprehended by the present invention.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for communicating cross-connection information within an optical network, by use of wavelength information, comprising the steps of:

abstracting cross-connection information of at least one node in the optical network to produce wavelength reachability information corresponding to a Traffic Engineering (TE) link; the wavelength reachability information describes cross-connection constraint between a first TE link and a second TE link and reachability between all wavelengths of the first TE link and all wavelengths of the second TE link on the same device;

distributing the wavelength reachability information of the at least one node in the optical network by utilizing a Link-State Advertisement (LSA) of an open shortest path first (OSPF) protocol; the wavelength reachability information comprises number of TE links reachable by a TE link, index of each reachable TE link, number of reachable wavelengths of each reachable TE link and value of each reachable wavelength; and updating the wavelength reachability information, when boards are added or removed, or when internal fiber connections are changed.

2. The method according to claim 1, wherein the cross-connection information comprises cross-connection constraints or capabilities.

3. The method according to claim 1, further comprising distributing the wavelength reachability information of the at least one node to at least one other node within the optical network.

4. The method according to claim 1, further comprising distributing the wavelength reachability information of the at least one node to at least one Path Calculation Equipment (PCE) of the optical network.

5. The method according to claim 1, wherein a link reachability sub_TLV is provided in a link TLV of an LSA10, containing the wavelength reachability information.

6. The method according to claim 5, wherein the link reachability sub_TLV comprises number, index, and reachable wavelengths of reachable TE links.

7. The method according to claim 1, further comprising abstracting the cross-connection information of the at least one node to produce sub-wavelength reachability information.

8. A system for communicating cross-connection information within an optical network, comprising:

a plurality of nodes within the optical network, wherein each of the plurality of nodes abstracts cross-connection information to produce wavelength reachability information corresponding to a Traffic Engineering (TE) link, distributes the wavelength reachability information to at least one other node in the optical network by utilizing a Link-State Advertisement (LSA) of an open shortest path first (OSPF) protocol, and updates the wavelength reachability information, when boards are added or removed, or when internal fiber connections are changed; the wavelength reachability information describes cross-connection constraint between a first TE link and a second TE link and reachability between all wavelengths of one the first TE link and all wavelengths of the second TE link on the same device; the wavelength reachability information comprises number of TE links reachable by a TE link, index of each reachable TE link, number of reachable wavelengths of each reachable TE link and value of each reachable wavelength; and at least one routing subsystem, adapted to calculate service paths by using the wavelength reachability information.

9. The method according to claim 8, wherein the cross-connection information comprises cross-connection constraints or capabilities.

10. The method according to claim 8, wherein a link reachability sub_TLV is provided in a link TLV of an LSA10, containing the wavelength reachability information.

11. The method according to claim 10, wherein the link reachability sub_TLV comprises number, index, and reachable wavelengths of reachable TE links.

12. The method according to claim 8, further comprising abstracting the cross-connection information to produce sub-wavelength reachability information.

* * * * *